United States Patent
Knox

(10) Patent No.: US 6,659,505 B1
(45) Date of Patent: Dec. 9, 2003

(54) ADAPTIVE VARIABLE LOAD LIMITED FOR PRIMARY OCCUPANT SAFETY RESTRAINT

(75) Inventor: Matthew J. Knox, Romulus, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/481,149

(22) Filed: Jan. 12, 2000

(51) Int. Cl.$^7$ .............................................. B60R 22/46
(52) U.S. Cl. ................. 280/806; 242/379.1; 280/801.1; 280/805; 280/808; 297/470; 297/475; 297/476; 297/479
(58) Field of Search .............................. 280/801.1, 803, 280/805, 806, 807, 808; 180/268; 297/470, 475, 476, 477, 478, 479, 480; 242/379.1, 381, 390.5, 390.6

(56) References Cited

U.S. PATENT DOCUMENTS

| | | | |
|---|---|---|---|
| 4,886,295 A | * 12/1989 | Browne ........................ 280/777 |
| 5,533,756 A | * 7/1996 | Dybro et al. ................. 280/806 |
| 5,607,118 A | 3/1997 | Dybro et al. | |
| 5,626,306 A | 5/1997 | Miller, III et al. | |
| 5,667,246 A | * 9/1997 | Miller, III .................... 280/806 |
| 5,913,538 A | 6/1999 | Herpich | |
| 5,924,641 A | 7/1999 | Keller et al. | |
| 5,971,489 A | 10/1999 | Smithson et al. | |
| 6,012,667 A | 1/2000 | Clancy, III et al. | |
| 6,102,439 A | * 8/2000 | Smithson et al. ........... 280/805 |
| 6,123,357 A | * 9/2000 | Hosoda et al. ............ 280/730.2 |
| 6,135,380 A | * 10/2000 | Brown ........................ 242/374 |
| 6,145,881 A | * 11/2000 | Miller, III et al. .......... 280/806 |
| 6,152,488 A | * 11/2000 | Hedderly et al. ............ 280/775 |
| 6,155,512 A | * 12/2000 | Specht et al. ............... 242/374 |

FOREIGN PATENT DOCUMENTS

| EP | 0 927 669 A2 | 12/1998 |
|---|---|---|
| JP | 11170974 | 12/1997 |
| WO | WO 99/55560 | 4/1999 |

* cited by examiner

Primary Examiner—Eric Culbreth
(74) Attorney, Agent, or Firm—Sally J. Brown; James D. Erickson

(57) ABSTRACT

A system and device for managing the restraints available for vehicle occupants that uses fluidic torque conversion to provide an adaptive variable load limiting for the primary occupant safety restraint. The fluidic torque conversion of this invention can be variably controlled through the use of an electro/mechanical flow control device. The flow control is preferably coupled to one or more sensors, including occupant weight, occupant position, seat position, low "g", high "g", and belt displacement/latching sensors. This invention is adapted to be responsive to the vehicles interior safety devices, including front air bags, side air bags, seat back pivots, head rests, collapsible steering wheel, and positioning of the dash board and/or vehicle instrumentation. This invention is a re-usable system. This invention can be applied to any rotational, pivotal or telescoping safety mechanism or device and by using hydro load limiting and energy absorbing management contributes to reduced occupant chest, back, neck or leg injuries as a result of a vehicle impact event.

11 Claims, 20 Drawing Sheets

ADAPTIVE VARIABLE LOAD LIMITED FOR PRIMARY OCCUPANT SAFETY RESTRAINT

BACKGROUND OF THE INVENTION

1. Field of the Invention

This invention relates to vehicle occupant restraints. More specifically this invention relates to the load management of vehicle safety related devices, including seat back pivots, seat positioning slides, seat belt buckles, seat belt retractors collapsible steering columns and head rests.

2. Description of Related Art

A variety of vehicle safety systems employing some form of load management or load limiting are well known in the prior art, however, most such load management systems or devices provide only static load management. That is, such systems or devices are designed to be effective for a specific impact force and a specific load. These systems are also designed only for particular restraints. Such systems are difficult to adapt to alternative restraint devices, thereby adversely affecting the restraint performance.

For general background material, the reader is directed to the following United States patents, each of which is hereby incorporated by reference for the material disclosed therein.

U.S. Pat. No. 3,666,198 describes an inertia reel type seat belt which allows the passenger restrained by the belt to make relatively slow movements to extend the belt from the reel but which locks the belt against further movement in the event of rapid changes in motion of the vehicle.

U.S. Pat. Nos. 3,737,197, 3,758,158 and 3,811,727 describe a seat belt anchor mechanism for a vertically movable suspension seat having a fore and aft adjustment feature that provides an anchor point for a lap belt, which is spaced from the floor and movable relative to the floor.

U.S. Pat. No. 3,784,224 describes a safety seat and safety cushion, which are used in combination with each other and with a safety belt as a passenger safety device for protection of a child during vehicular travel.

U.S. Pat. No. 3,811,702 describes a safety device for protecting a vehicle occupant from injury during collision of a motor vehicle, which device includes a seat belt extending over the set portion of a seat of the motor vehicle, and a shock absorber associated with the seat belt for absorbing an energy of the vehicle occupant due to sudden deceleration of the vehicle.

U.S. Pat. No. 3,856,328 describes a seat belt or shoulder strap extending about moveable and fixed pulleys in a block and tackle configuration.

U.S. Pat. No. 3,865,433 describes a deformable safety device upon which a seated passenger in a violently decelerating conveyance can loose kinetic energy by doing mechanical work.

U.S. Pat. No. 3,887,233 describes a shoulder harness and lap belt restraint system, which are provided wherein the lap belt is combined with the shoulder harness in such a manner that a single fastening suffices to fasten both the shoulder strap and the lap belt.

U.S. Pat. No. 3,891,272 describes a motor vehicle safety belt system that includes a switch actuated by the engagement of the driver's safety belt and a network for starting the vehicle engine upon the actuation of the switch.

U.S. Pat. No. 3,930,622 describes an energy storing safety belt retractor that has a locking bar operated by an inertia response means, which includes an inertia responsive mass and a locking bar for locking with the teeth of the ratchet wheel associated with the belt winding wheel of the retractor.

U.S. Pat. No. 3,952,967 describes an energy dissipater for a vehicle safety belt that includes a reel on which one end of the belt is wound and anchored, the reel having two internal screw threads of opposite pitch.

U.S. Pat. No. 3,999,780 describes a cylinder-piston assembly of a gas-operated actuator for straining a seat belt when a vehicle encounters a collision.

U.S. Pat. No. 4,027,829 describes a flywheel and clutch mechanism that is adapted for use in a safety belt retractor having a vehicle-sensitive mechanism and a pawl.

U.S. Pat. No. 4,027,905 describes a seat belt system for a vehicle wherein one end of a seat belt for restraining an occupant is firmly engaged with one end of a steel strip, which is held and guided by an anchor member firmly attached to a vehicle body in such a way that when the impact energy acts upon the seat belt the strip may be subjected to plastic deformation at least at two positions.

U.S. Pat. No. 4,060,278 describes an energy absorbing member for a safety belt that includes a metal band that is provided with a plurality of elongated slots arranged in staggered parallel rows extending transversely to the direction of the loading of the safety belt.

U.S. Pat. No. 4,061,291 describes a safety belt reel that comprises a coil spring, a shaft on which a safety belt is stored and a variable torque device couples said spring to said shaft.

U.S. Pat. No. 4,100,996 describes a shock absorber for a safety belt lanyard.

U.S. Pat. No. 4,138,157 describes an energy absorbing seat belt restraint that comprises a thin, flexible elongated element having a length substantially greater than its width and adapted for securing a wearer in a vehicle.

U.S. Pat. No. 4,192,530 describes a vehicle passive seat belt restraint system that includes a seat belt adapted to be positioned across and in contact with the torso of a vehicle occupant.

U.S. Pat. No. 4,235,456 describes a passive occupant restraint system that has a track extending longitudinally inboard an occupant seat and which mounts a belt carriage which slidably receives lap and shoulder belts having their outboard ends attached to the door and their inboard ends attached to the vehicle structure forwardly of the occupant.

U.S. Pat. No. 4,349,216 describes a floating lock mount for a seat belt retractor for application in situations where the seat or seats served by the retractor is shifted forwardly or rearwardly by the user so as to accommodate the positioning of legs and to adjust the seating to the user.

U.S. Pat. No. 4,411,448 describes a belt transfer system for a passive vehicle occupant restraint belt system that comprises a DC power source, a reversible DC motor and circuits for connecting the motor across to the power source for reversible operation and for braking the motor at the end of each operation.

U.S. Pat. No. 4,457,251 describes an apparatus for indicating the load on a restraining device subject to tensile loading, especially for a safety belt.

U.S. Pat. No. 4,473,242 describes a belt system that includes a retractor, mounted on the seat and directly involving the lap belt section, that comprises an attachment buckle connected to its anchor point by an expandable link device.

U.S. Pat. No. 4,492,348 describes a locking apparatus for use with safety belts of the which are protracted and retracted on a spool, which is locked by inertia forces in an emergency.

U.S. Pat. No. 4,500,114 describes a flow control device for use with inflatable confinements or "air bags" of vehicle occupant safety restraint systems.

U.S. Pat. No. 4,568,106 describes a passive restraint for a vehicle set that comprises a seat belt, which is designed so as to secure the security of an occupant.

U.S. Pat. Nos. 4,784,434 and 4,813,645 describe a vehicle seat with a suspension device having a fixed belt anchor to be joined with a seat belt and where the suspension device is adapted for absorbing a vibration or shock.

U.S. Pat. No. 4,805,467 describes a safety belt assembly that measures the amount of force exerted on the assembly and also the point in time when a force was exerted on the assembly.

U.S. Pat. Nos. 4,904,023 and 5,005,909 describe a force-limiting energy absorber for safety belt systems that comprises a series of stretch members lying one behind the other in the direction of tensile stress.

U.S. Pat. No. 4,929,027 describes a passive restraint enhancer for supplementing the safety of the seat belt, of the shoulder harnessing type, for minimizing or preventing injury in vehicle accidents.

U.S. Pat. No. 4,940,193 describes a safety belt retraction apparatus that includes a safety belt retractor mechanism mounted on the vehicle door, and having a reel about which the webbing of the safety belt is wound.

U.S. Pat. No. 4,948,199 describes a force limiter, for use with a safety belt device, that comprises a stretch element, which is inserted into the force flow path and which under tensile load deforms in a force-limiting manner.

U.S. Pat. No. 4,978,139 describes an energy absorbing damping device for safety belts of motor vehicles, for the purpose of controlled reduction of the deceleration force which acts on the belt user in the event of a collision.

U.S. Pat. No. 4,979,400 describes a safety belt assembly that measures the amount of force exerted on the assembly and the point in time when a force is exerted on the assembly.

U.S. Pat. No. 4,993,747 describes an electro-rheological belt load anchorage mechanism that permits a seat to be moved relative to the vehicle body to a position chosen by the occupant.

U.S. Pat. No. 5,000,481 describes a seat belt locking device designed to temporarily modify a shoulder/lap belt occupant restraint system in a vehicle to secure a child's restraint seat in place in the vehicle.

U.S. Pat. No. 5,005,894 describes an automotive seat with a suspension device that has an X-shaped link mounted between an upper seat frame and a lower floor frame.

U.S. Pat. No. 5,015,010 describes a seat integrated three point seat belt system, that includes a belt having one end affixed to the seat and an opposite end mounted to a retractor secured to the seat.

U.S. Pat. No. 5,031,961 describes an automotive seat assembly that has a mounting arrangement for seat belt components, which allows the fore and aft movement of the components with the seat and effects load transfer from the seat belt to the automotive vehicle body.

U.S. Pat. No. 5,069,482 describes a force limiter for safety belt restraining systems, that includes a cylinder where a rod is received, which at its one end projections out of the cylinder and at its other end defines a free space in which a plurality of roller elements are accommodated.

U.S. Pat. No. 5,255,868 describes a self-locking safety belt reeling device that comprises a reeling arbor disposed in a belt housing, which is further provided with a spring housing attached to the belt housing.

U.S. Pat. No. 5,340,046 describes an energy converter for a safety belt that comprises a sleeve with a sleeve channel.

U.S. Pat. No. 5,464,252 describes an anchor device for a seat belt for connecting a webbing to a vehicle, the webbing for restraining an occupant to a seat so that a load applied to the webbing is received by the vehicle body.

U.S. Pat. No. 5,468,053 describes an energy absorbing beam, constructed for use in a vehicle seat belt restraining system, that includes an energy absorbing beam which is mounted or fastened to a vehicle frame or vehicle seat frame.

U.S. Pat. No. 5,518,271 describes a dense mass safety system centrally located in a personal vehicle that acts as an inertial analog computer for predicting and compensating for the motion of an occupant of the vehicle during crashes.

U.S. Pat. No. 5,522,564 describes a self-locking safety-belt reeling device that has a reeling shaft on which a safety belt is wound.

U.S. Pat. No. 5,533,756 describes a safety restraint system that comprises a safety belt system for restraining an occupant that further comprises a safety belt; a retractor; shoulder belt; a pretensioner; and a load limiter.

U.S. Pat. No. 5,547,143 describes a load absorbing retractor that comprises a rotating spool or reel, seat belt webbing secured to the reel, and at least one movable bushing.

U.S. Pat. No. 5,566,978 describes a vehicle seat belt system that has a plurality of sensors to sense the characteristics of a vehicle occupant and of a vehicle collision.

U.S. Pat. No. 5,580,091 describes a low-cost energy management device for dissipating a portion of the energy imparted to a safety belt in a rapid vehicular deceleration is comprised of a strap and a channel-shaped guide and deflector member.

U.S. Pat. No. 5,626,306 describes an energy absorbing seat belt retractor that comprises a frame; a spool; a lock pawl; and a movable nut.

U.S. Pat. No. 5,641,198 describes a vehicle occupant restraint system that includes a seat and a length of belt webbing connected with the seat.

U.S. Pat. No. 5,664,807 describes a force limiter for use in a vehicle occupant restraining system.

U.S. Pat. No. 5,667,246 describes a safety restraint system that comprises a safety belt system for restraining an occupant that includes a safety belt, a retractor, a shoulder belt, a pretensioner, and a load limiter.

U.S. Pat. No. 5,685,603 describes a support device apparatus for a vehicle that includes a child seat.

U.S. Pat. No. 5,687,925 describes a seat belt webbing retractor that includes a spool assembly around which seat belt webbing is wound.

U.S. Pat. No. 5,700,035 describes a force limiter for vehicle safety belt systems, which is inserted in the flow path of the safety belt system by means of two fittings, the distance between the fittings being able to be increased with a conversion of energy.

U.S. Pat. No. 5,722,689 describes a device for cushioning a safety belt of a vehicle, that includes a resilient member having one end secured to the vehicle and having a clamping device secured to the other end.

U.S. Pat. No. 5,738,293 describes a safety belt retractor, that comprises a frame, a belt reel rotatably mounted in the frame, and a rotary pretensioner drive adapted to be drivingly coupled to the belt drum.

U.S. Pat. No. 5,746,449 describes a seat belt device for a vehicle, which improves shock absorbing forces without reducing a space of an interior of a vehicle.

U.S. Pat. No. 5,785,388 describes a seat belt pillow having a web and two arms of uniform thickness in a non-compressed state.

SUMMARY OF THE INVENTION

It is desirable to provide a load management system for vehicle safety devices that provides optimal performance through a broad range of accelerations and occupant weights, during both low "g" and high "g" collision or near-collision events. Moreover it is desirable to provide a load management system that maintains its capabilities after its first use and which can cooperate with such other vehicle interior sub-systems as: seat back pivots; seat position slides; head rests; the steering column; seat belts and buckle loading at the anchor; seat belt displacement control and loading at the retractor spool.

Accordingly, it is a general object of this invention to provide a vehicle restraint load management system, which provides optimal safety system performance through a broad range of accelerations and occupant weights.

It is a further object of this invention to provide a vehicle restraint load management system, which continues to function properly after the first use.

It is another object of this invention to provide a vehicle restraint load management system, which is easily adaptable to a wide variety of restraints and/or retractors.

Another object of this invention is to provide a vehicle restraint load management system, which provides dynamic load management response.

A further object of this invention is to provide a vehicle restraint load management system, which is specifically adapted to cooperate with other vehicle interior sub-systems, such as: seat backs, head rests, seat positioning slides, seat belt buckles, seat belt retractors, and collapsible.

A still further object of this invention is to provide a vehicle restraint load management system, which can control the amount of restraint belt displacement and loading of the seat belt retractor spool.

Another object of this invention is to provide a vehicle restraint load management system, which can be triggered and managed dynamically during a collision event based upon occupant weight, excursion and belt displacement.

A further object of this invention is to provide a vehicle restraint load management system, which provides optimum occupant comfort and performance during a collision event, by multiple dynamic load management techniques.

It is another object of this invention to provide a vehicle restraint load management system, which employs fluidic torque conversion to manage occupant loading.

It is a further object of this invention to provide a vehicle restraint load management system, which is responsive to interior safety devices such as frontal air bags and frontal instrumentation when determining the amount of managed belt load displacement.

A still further object of this invention is to provide a vehicle restraint load management system, which can be activated or de-activated in real time or pre-set based on the conditions of contributing sensors/variables.

These and other objects of this invention are intended to be covered by this disclosure and are readily apparent to those of ordinary skill in the art upon review of the following drawings, detailed description, claims and abstract.

BRIEF DESCRIPTION OF THE DRAWINGS

The accompanying drawings incorporated in and forming a part of the specification, illustrate a preferred embodiment of the present invention. Some, although not all, alternative embodiments are described in the following description. In the drawings.

Figure 1:
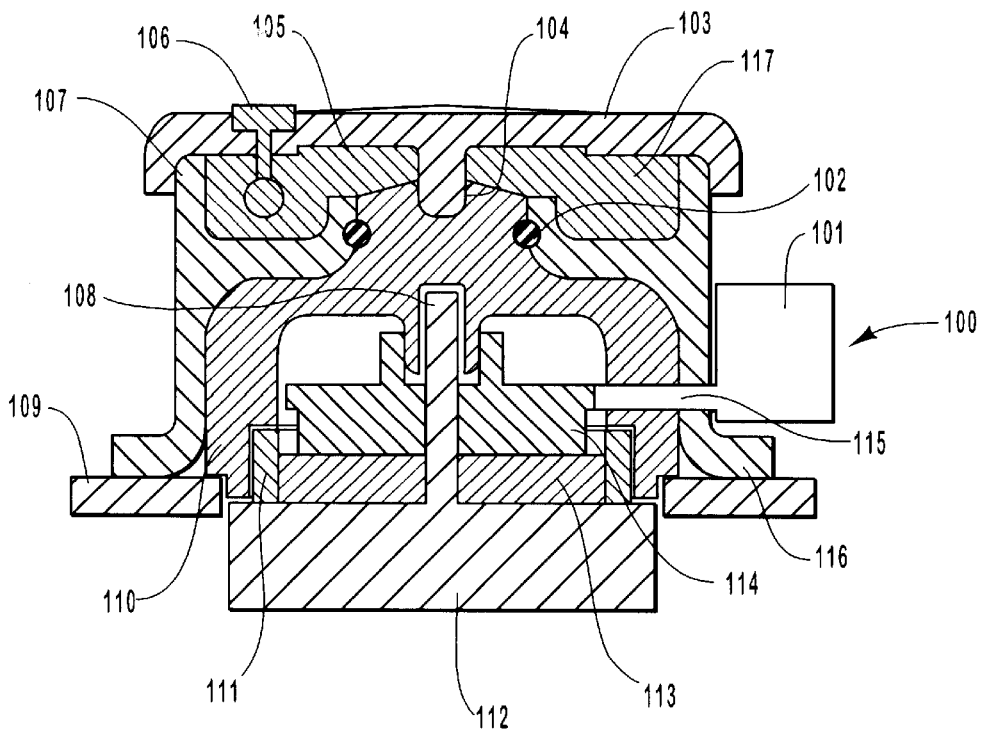
FIG. 1 depicts a cross-sectional assembly view of the preferred real time load management module.

Reference will now be made in detail to the present preferred embodiment of the invention, an example of which is illustrated in the accompanying drawings.

DETAILED DESCRIPTION OF THE INVENTION

This invention is an adaptive variable load limiter for control and management of vehicle occupant safety restraints. This invention makes use of fluidic torque conversion as technique for managing occupant loading of a vehicle safety system during both low "g" and high "g" events to provide improved safety system performance through a greater range of acceleration (deceleration) and a greater range of weight of vehicle occupants. (For the purpose of this disclosure, the term "event" is intended to mean a vehicle collision, near collision, or other accident scenario where vehicle occupant restraints are intended to provide enhanced occupant safety.) Fluidic torque conversion is variably controllable though the use of an electro-mechanical flow control device. Flow control can be directly coupled with occupant weight sensors, belt restraint displacement sensors, seat/occupant position sensors and low/high "g" sensors. Moreover, the electro-mechanical flow control for the occupant belt loading, using this invention, is responsive to the existence and position of vehicle interior devices, such as frontal air bags and frontal vehicle instrumentation when managing the amount of belt load displacement. This invention provides that flow control activation/deactivation can be determined either in real time or can be pre-set based on the conditions identified by the various contributing sensors and/or variable.

For example, if the vehicle occupant's weight is known, a pre-set flow setting can be activated, thereby managing the load and displacement in a manner optimized relative to interior surroundings based upon the acceleration and/or velocity of the event. Also, if the occupant seating position is not ideal, then both the occupant weight and the seating position may influence the rate in which the belt restraint displacement is load managed. If the load management of this invention is used within the seat belt buckle, restraint, seat back and steering column then simultaneous triggering of each load cell can be executed, resulting in controlled and predictable loading of each safety sub-system. This coordination of the sensors and the restraint devices through a controller results in optimum occupant restraint, safety and comfort during an event.

Electro-mechanical flow control, as provided by this invention, can also use mechanical self adjusting flow control valves, which can automatically align or adjust themselves relative to pressure and/or energy levels sensed in the flow port. This flow control can also use averaged pre-set/calculated burst chamber techniques, such as those used in staged air bag deployments. Several pre-calculated burst chambers can be placed in the flow path, thereby creating a load management range appropriate for large, medium, and small occupants. Typically, activation/deactivation of the flow control device is made using a low "g" tilt sensor or alternatively or in combination with a high "g" sensor trigger, such as is generally used in most air bag control modules.

The system of this invention can be applied in alternative embodiments to additional interior sub-systems, which can assist in the management of the occupant excursion energy generated during an event. Such sub-systems may include seat back pivots. Seat back pivots can be damped during rear impact events, thereby providing the occupant with an energy absorber in the occupant's back and neck area. The seat back pivot can also be damped during forward impact events to provide the occupant with the maximum belt retention, thereby controlling forward excursion when the occupant is fully restrained. In combination with the seat back, seat track forward and rearward load management can be used. A further use of this invention involves the steering column having a collapsible type of construction. During an impact event the steering column can be adapted to collapse, much like a shock absorber. However, using this invention, the steering column may be controlled to collapse dynamically and in relationship to the occupant loading. In this manner, the occupant is provided with additional chest protection during an event. Yet further applications of this invention are the control of the restraint belt displacement and loading at the belt anchor and the retractor spool. Through the use of this invention the total restraint system can be triggered and managed dynamically during an event based upon occupant weight, position, excursion and belt displacement. Multiple dynamic load management strategies can be developed and executed simultaneously to provide optimized occupant comfort and safety system performance during an event. Through the use of the load/energy management techniques of this invention, the ability of safety restraints and systems enhance their contributions to reduced vehicle occupant chest, back, neck or leg injuries that would otherwise occur as a result of a vehicle event.

The figures that follow provide detail on the mechanical components and the various applications of this system, as well as how the system can be adapted to work with any rotational, pivotal, or telescoping mechanism.

FIG. 1 shows a cross-sectional assembly view of the torque converter cross section of the preferred real time load management module. This torque converter 100 is specifically adapted to work with a conventional safety belt retractor. The preferred embodiment of this torque converter 100 includes the following mechanical components. A sensor assembly 101 is provided to activate/deactivate, via preferably a low "g"/tilt sensor (not shown) is connected by the sensor extension 115 to the retractor ratchet wheel 114. When the sensor 101 activates the retractor ratchet wheel 114, the retractor load bearing mechanics 113, which is this preferred embodiment are engagement teeth 111 or "lock dogs", cause engagement with the torque converter rotor drive 110. This drive 110 has a positive link via an upper shaft guide 104 with the displacement rotor 117 located in an isolated sealed upper chamber 105. The rotor 117 then begins to displace a fluid into an adjoining chamber through an orifice, which is an electro-mechanically controlled set. The control of the positive fluid displacement regulates the rate at which the occupant restraint is allowed to displace or spool out, thereby resulting in occupant chest to belt relief during high "g" events. The regulated flow/pressure settings can be established from occupant weight or pressure build up within the rotor chamber 105. A lower shaft guide 108 connects the rotor drive 110 with the retractor spool 112. A seal 102 is provided between the rotor upper chamber 105 and the rotor drive 110. A control valve 106 provides the control of fluid flow to the rotor upper chamber 105. Also, provided are a cover 103, mounted on and covering the rotor upper chamber 105 and a base 116, 107, which provides the outer shell of the torque converter 100 and is mounted on the retractor frame 109.

Figure 2:
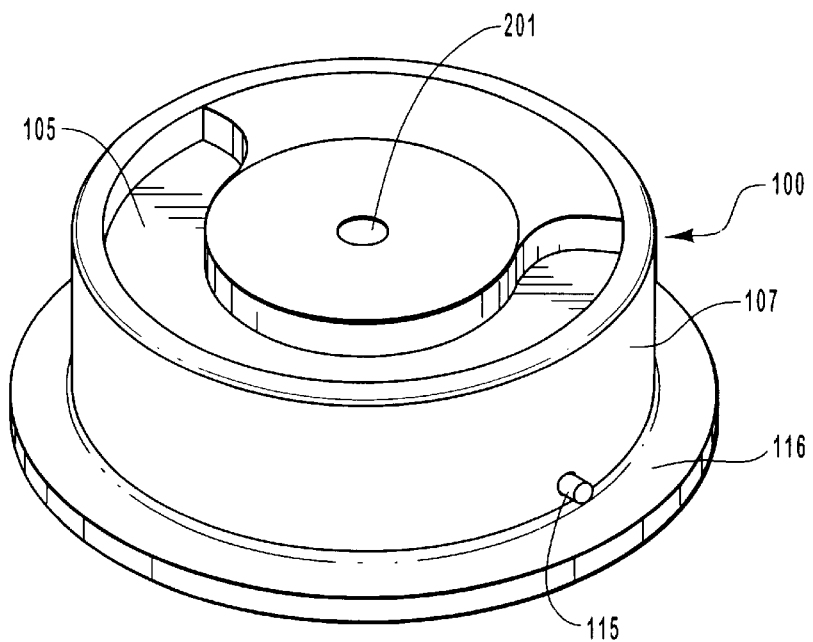
FIG. 2 depicts a perspective view of the real time load management device.

FIG. 2 shows a perspective view of the preferred real time load management device 100 of this invention. This view shows the base 116 adapted to a typical retractor frame. The displacement chambers (not shown) are separated by a valve port (not shown) which can be pre-set, electro/mechanically set, or mechanically set/adjusted by pressure velocity or rate. The sensor extension 115 is shown here as a slide activator, which engages with the low "g" sensor mechanics 101. The cover (shown in FIG. 4) provides the seal for the upper compression chambers 105. Positive fluid displacement is generated by the rotation of the rotor 117, which is directly coupled to the retractor spool shaft 108, via the rotor drive 110. The onset of fluid displacement or rotation of the rotor 117 can only become active once a peak pressure has been exceeded. This feature allows the vehicle safety restraint to be used during low "g" applications without engagement of the load limiting capabilities of this invention. This is accomplished by the setting of the valve port in the control valve 106. Reuse of the load limiting function is provided through the use of a return spring (not shown) on the rotor drive. In the preferred embodiment of this invention, in the event that the converter has been activated, the load cell with the return spring will slowly seek the home position. Rapid return or slow return is based upon the spring force. This feature can be variably controlled by design preference. The current preferred embodiment of the invention is designed to be flange mounted onto pivot or rotational shafts such as a buckle anchor, retractor, seat back, and seat track for forward or aft positioning pivots. The positive displacement from one chamber 105 to another is directly metered through the control valve/orifice. The preferred torque converter 100 of this invention has a generally vertical wall portion 107 of the base and an upper shaft guide opening 201 for receiving the upper shaft 104 of the cover 103.

Figure 3:
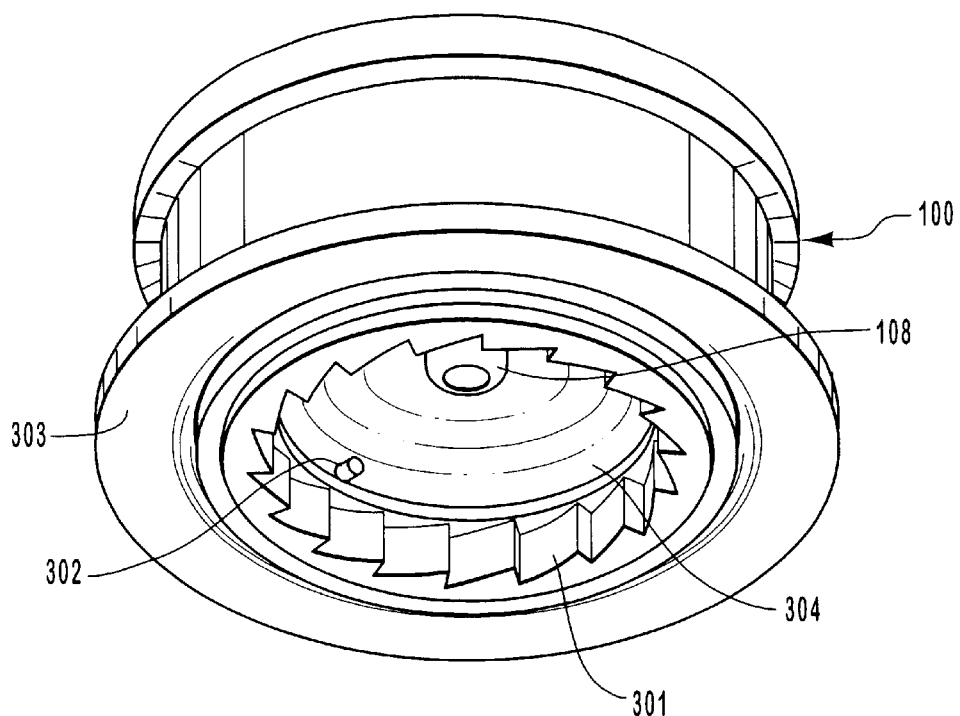
FIG. 3 depicts an interior perspective view of the real time load management torque converter device.

FIG. 3 shows an interior bottom side perspective view of the real time load management torque converter device 100. Rotor drive teeth 301 are designed to fit the retractor load bearing locking teeth 111. A center shaft guide 108 is provided to keep the rotational assemblies aligned during normal use or while under a load. The interior portion 302 of the sensor extension 115 is shown entering the lower chamber 304 of the torque converter 100 where the retractor ratchet wheel 114 is positioned. The retractor ratchet wheel 116 will be free to move unless the sensor extension 115 is engaged. The base 116 flange 303 mount directly to the retractor frame 109 which then secures the functional relationship between the load cell and the retractor. The bottom chamber 304, which is mechanically operated, and the upper chamber 105, which utilizes fluid mechanics, are sealed from one another through the use of an interior rotor drive shaft seal 102 located in the base 107. The components of this assembly are held in place by the base 107 and the cover 103.

Figure 4:
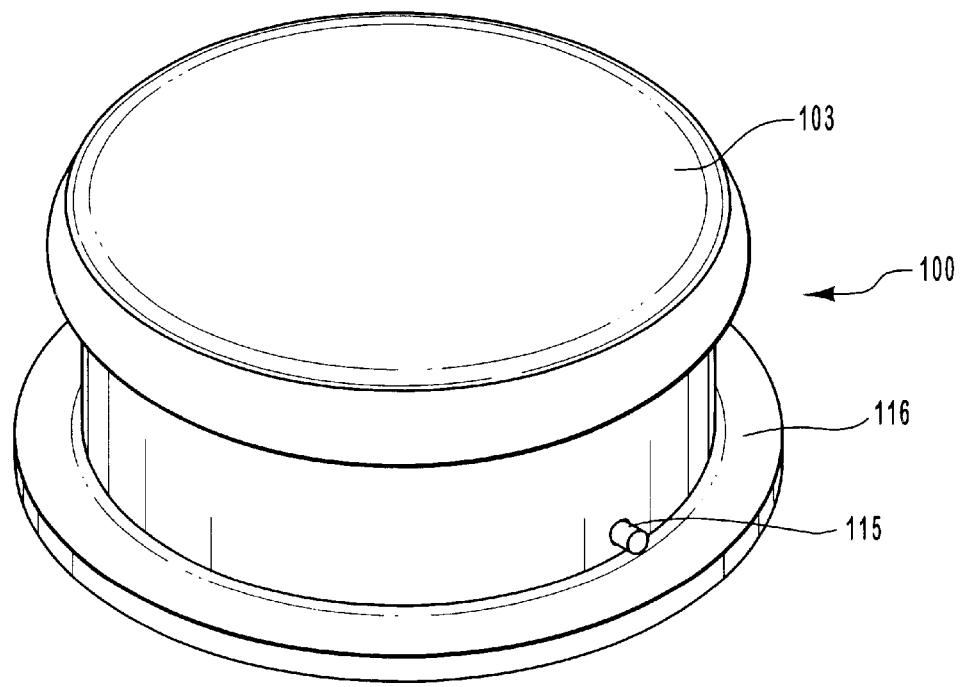
FIG. 4 depicts an exterior assembly view of the real time load management cover.

FIG. 4 shows the top an exterior assembly view of the real time load management torque converter 100 with the cover 103 attached. The base 116 and the sensor extension 115 are shown in their preferred locations.

Figure 5:
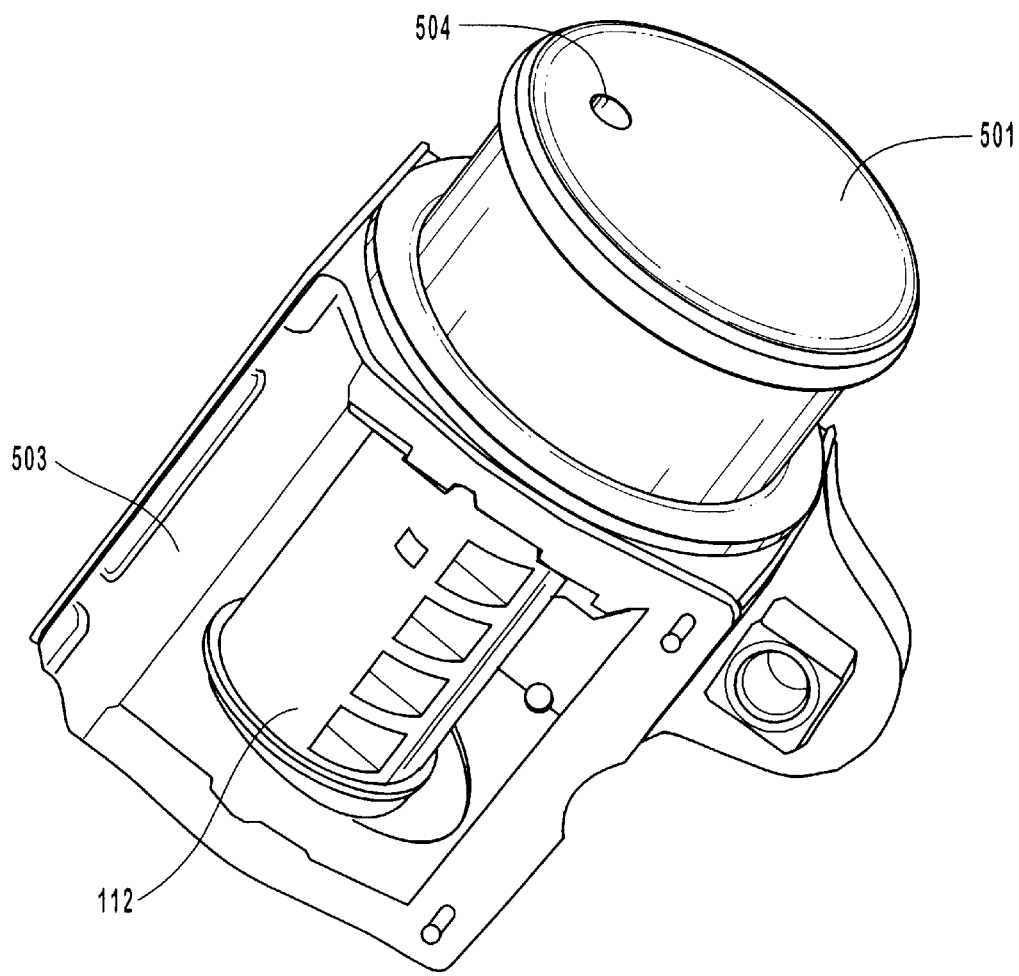
FIG. 5 depicts a perspective and internal view of the preferred retractor with an adaptive hydro/mechanical load limiter.

FIG. 5 shows a perspective and internal view of the preferred retractor with an adaptive hydro/mechanical load limiter. The load cell 501 as well as the control valve port 504, previously described are shown in their preferred embodiment. The retractor spool 112 is shown mounted in the retractor frame 503.

Figure 6:
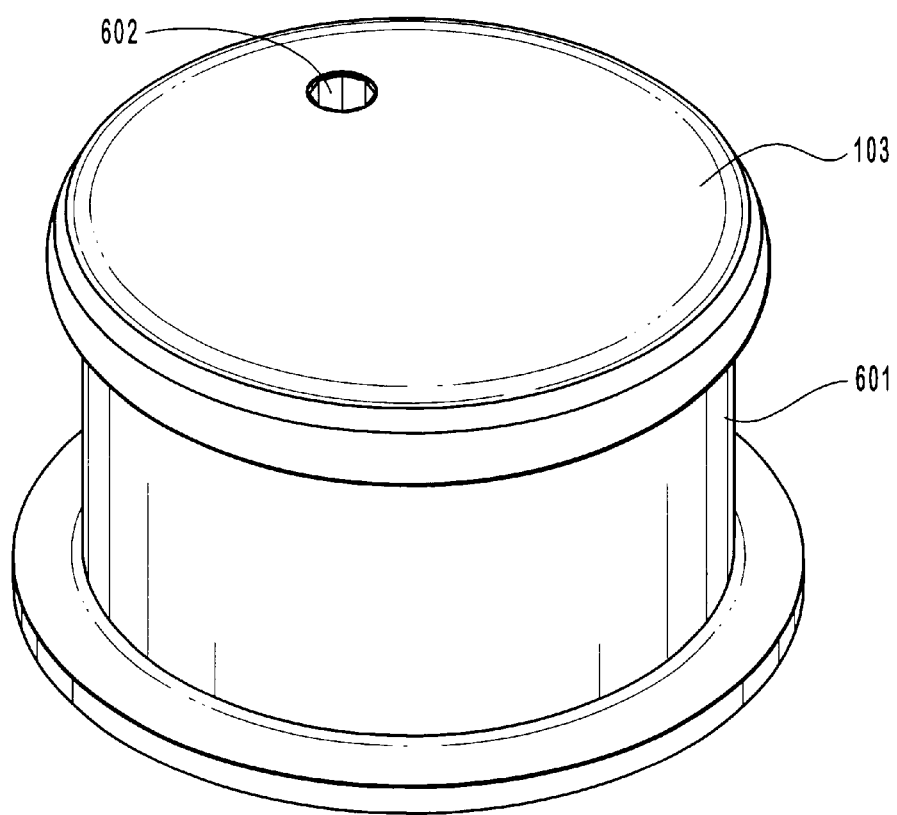
FIG. 6 depicts a detailed perspective view of the real time control module housing and cover.

FIG. 6 shows a detailed perspective view of the real time control module housing 601 and cover 103 with the preferred control valve port 602, which was previously described. In its preferred use, this housing 601 is fitted securely over load cell 501 of FIG. 5.

Figure 7:
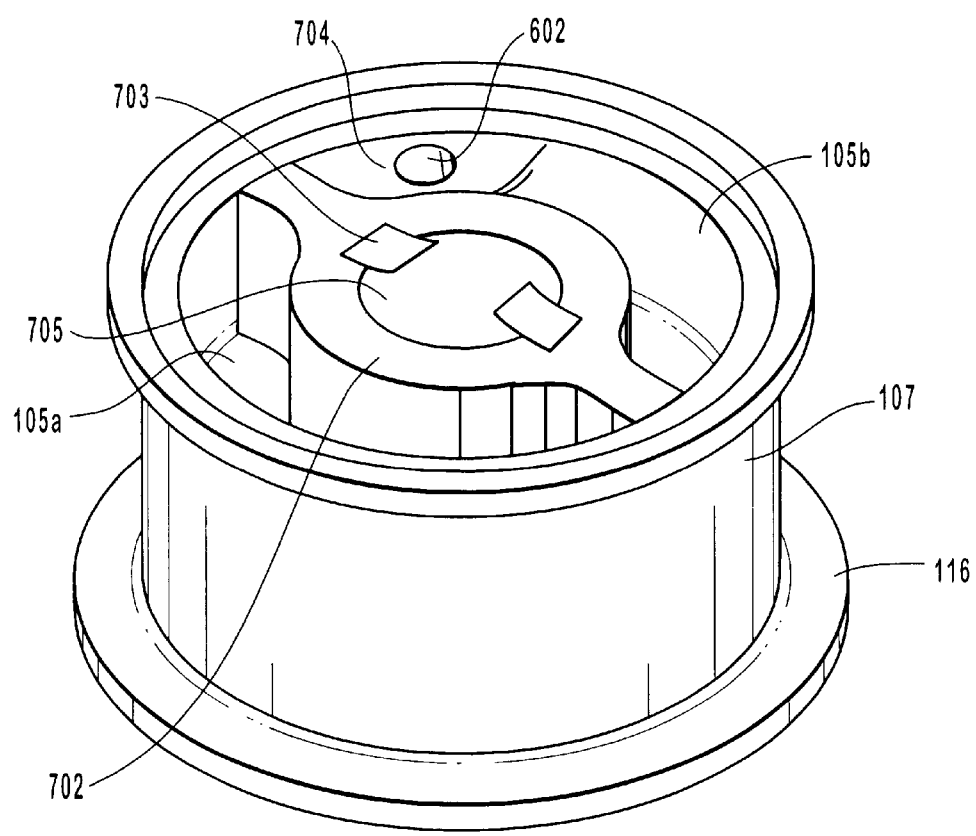
FIG. 7 depicts a detailed perspective view of the interior of the real time control module housing.

FIG. 7 shows a detailed perspective view of the interior of the real time control module. The base 116 and base wall 107 are shown, within which are a key lock 703 including a locking wheel shaft 705 is provided. A load propeller 702 provides separation between the fluid chambers 105a,b. Valve porting 704 is provided with the control valve port 602.

Figure 8:
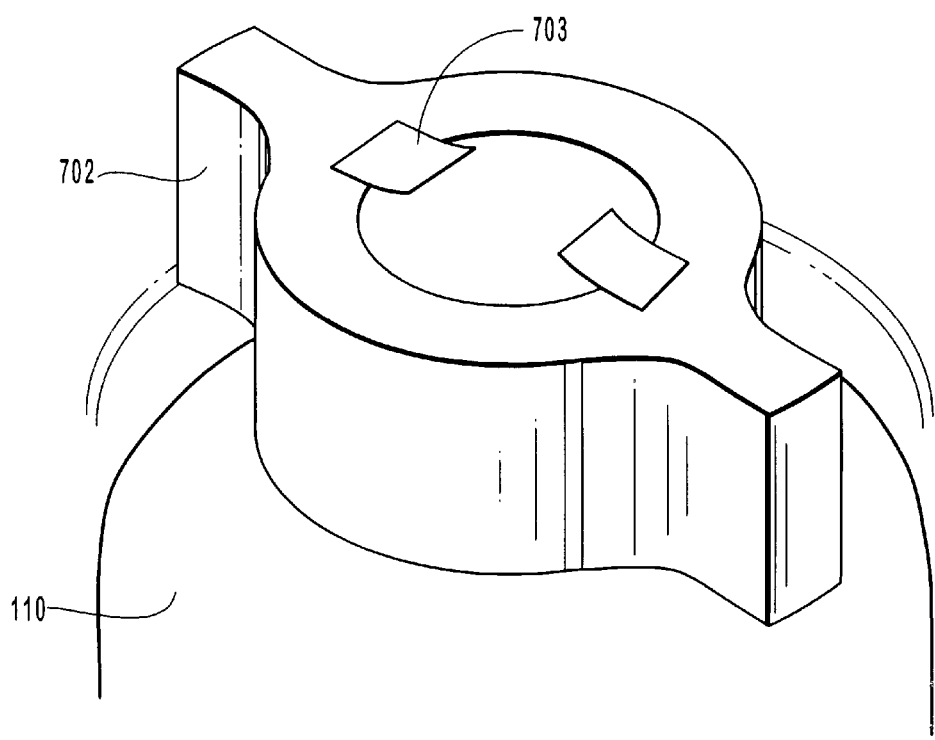
FIG. 8 depicts a detailed perspective view of the locking wheel of the real time control module of this invention.

FIG. 8 shows a detailed perspective view of the locking wheel of the real time control module of this invention. The key lock 703, with load propeller 702 are mounted on the top of the locking wheel 801.

Figure 9:
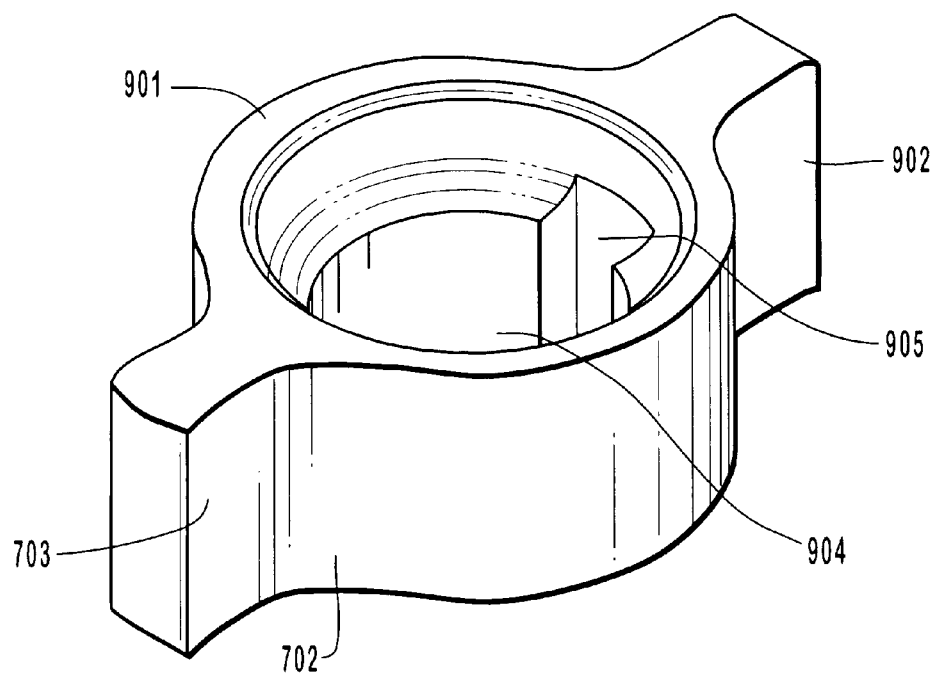
FIG. 9 depicts a detailed bottom perspective view of the load propeller of the real time control module of this invention.

FIG. 9 shows a detailed bottom perspective view of the load propeller 702 of the real time control module of this invention. This preferred embodiment of the load propeller 702 has two blade portions 902, 903 extending outwardly from the center portion 901. Within the center portion 901 is an opening 904 for receiving locking wheel shaft 705. This opening 904 is keyed 905 for firmly engaging the shaft 705.

Figure 10:
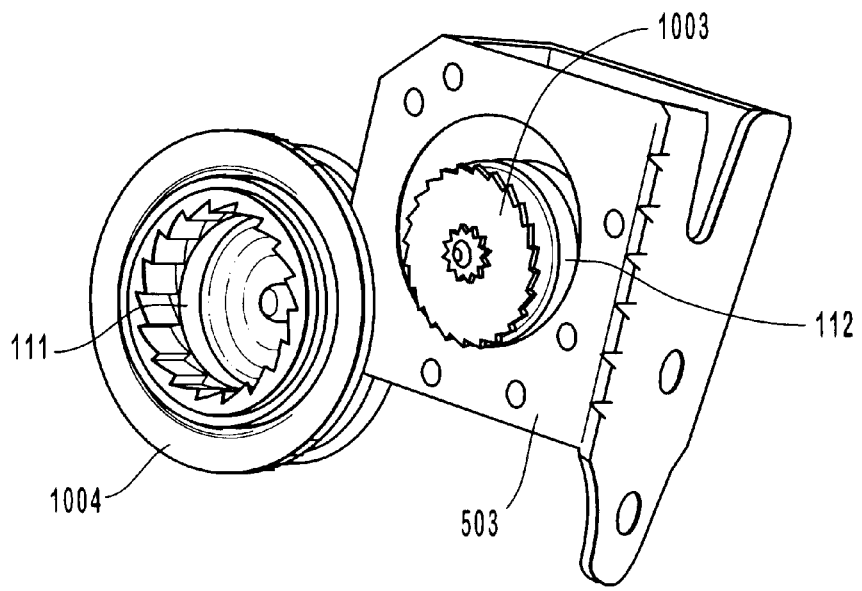
FIG. 10 depicts an alternative perspective and internal view of the preferred retractor with an adaptive hydro/mechanical load limiter.

FIG. 10 shows an alternative perspective and internal view of the preferred retractor with the adaptive hydro/mechanical load limiter. This view shows the bottom 1004 of the load cell 501. The retractor spool 112 with engagement means schematically show is shown within the retractor frame 503. In the bottom 1004 of the load cell 501, this view shows the rotor drive engagement teeth 111.

Figure 11:
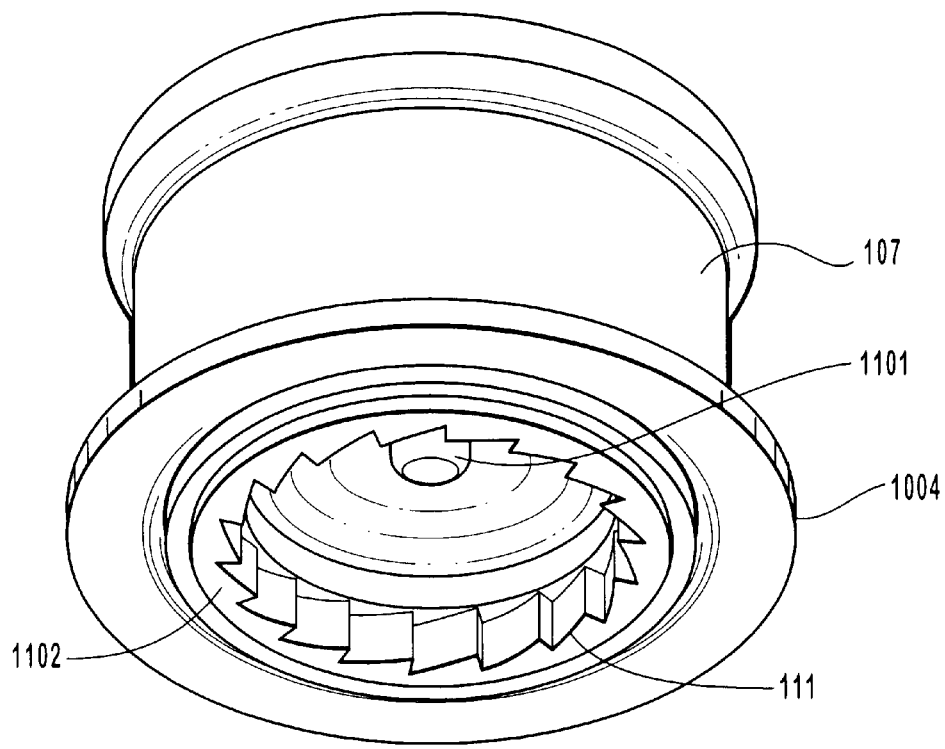
FIG. 11 depicts a detailed bottom perspective view of the load cell of the preferred real time control module of this invention.

FIG. 11 shows a detailed perspective view of the bottom 1004 of the load cell 501 of the preferred real time control module of this invention. This view provides additional detail of the locking wheel 1102 and the ratchet wheel guide 1101. The engagement teeth 111 are on the locking wheel 1102.

Figure 12:
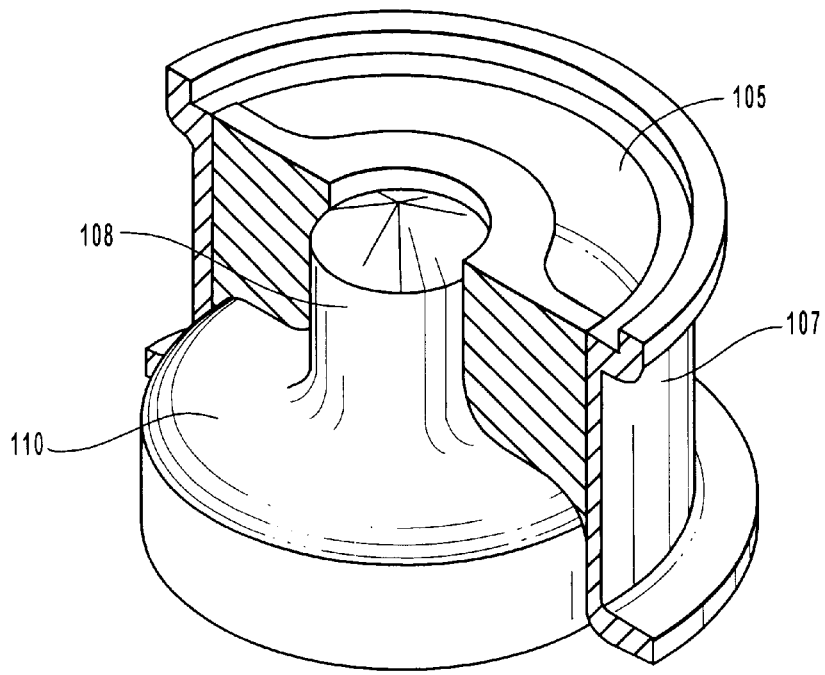
FIG. 12 is a section perspective view of the top view of the real time control module assembly of this invention.

FIG. 12 is a section perspective view of the top view of the real time control module assembly of this invention. The rotor drive 110 is shown attached to the retractor spool 108. The upper chamber 105 is shown within the base 107.

Figure 13:
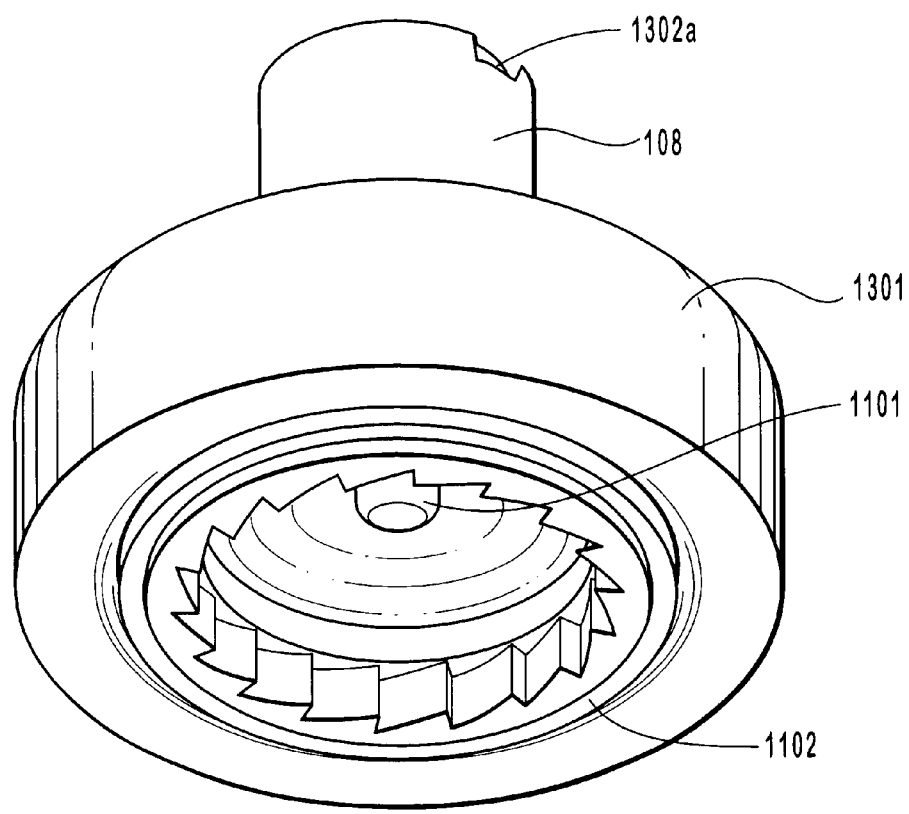
FIG. 13 depicts a detailed bottom perspective view of the locking wheel of the load cell of the preferred real time control module of this invention.

FIG. 13 shows an additional detailed bottom perspective view of the locking wheel 1102 of the load cell 501 of the preferred real time control module of this invention 100. The ratchet wheel guide 1101 is shown extending into the interior of the locking wheel 1102. The lower shaft guide 108 is shown extending from the outer surface 1301 of the locking wheel 1102. A notch 1302a is provided in top of the lower shaft guide.

Figure 14:
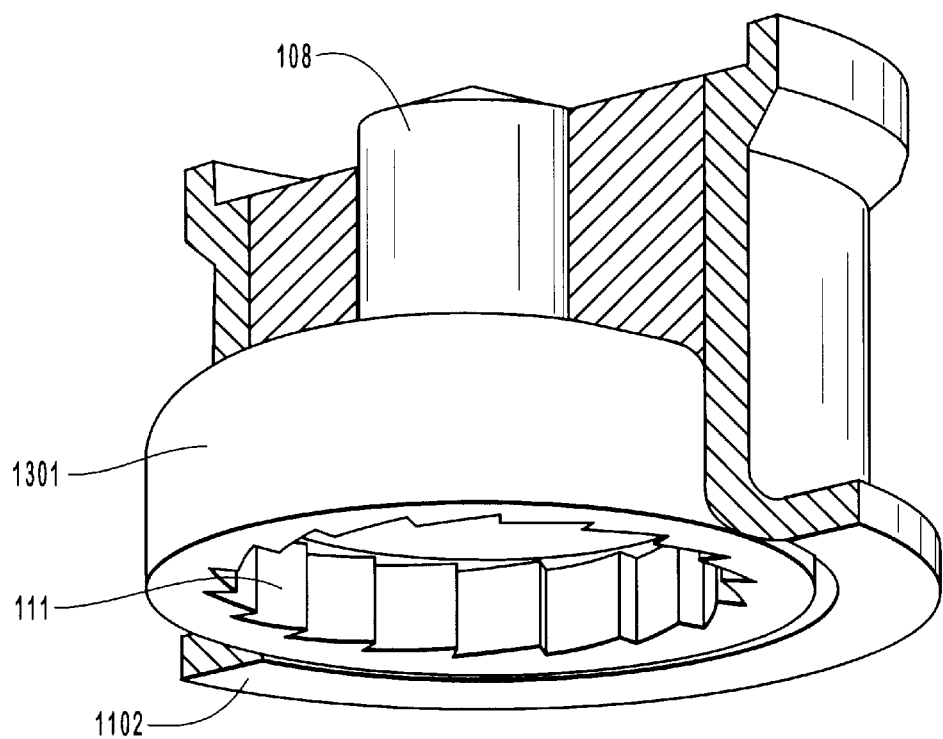
FIG. 14 depicts a perspective section view of the locking wheel of this invention.

FIG. 14 shows a perspective section view of the locking wheel 1102 of this invention. The lower shaft guide 108 is shown as are the rotary drive engagement teeth 111.

Figure 15:
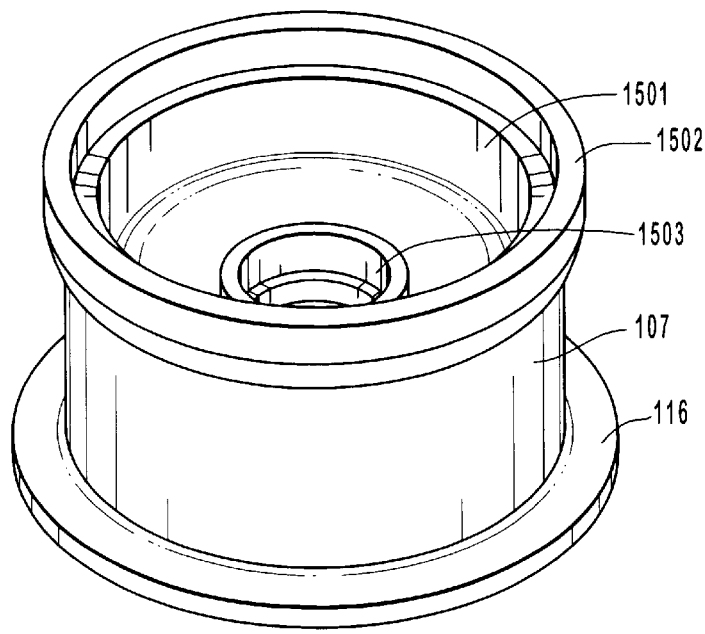
FIG. 15 depicts a perspective top view of the housing of this invention.

FIG. 15 shows a perspective top view of the housing 107 of this invention. This view shows the interior 1501 of the top of the housing 107, which is provided with an opening 1503 for receiving the shaft guide 108. A top lip surface 1502 is provided for support of the cover 103.

Figure 16:
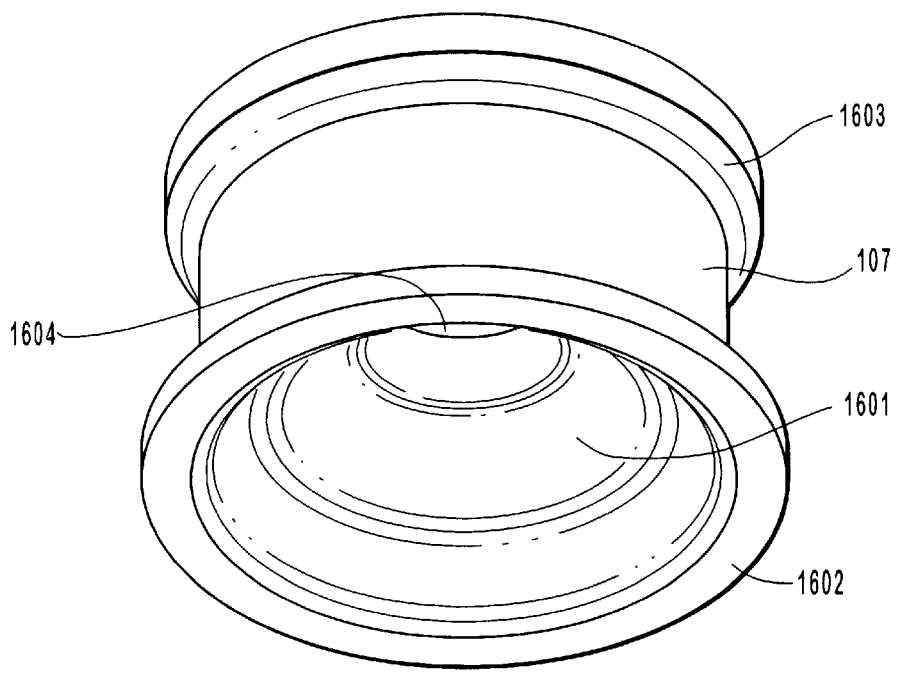
FIG. 16 depicts a perspective bottom view of the housing of this invention.

FIG. 16 shows a perspective bottom view of the housing 107 of this invention. This view shows the interior 1601 of the bottom of the housing 107. An opening 1604 is provided for receiving the shaft guide 108. The bottom surface 1602 of the base 116 is shown, as is the bottom 1603 of the top lip surface 1502.

Figure 17:
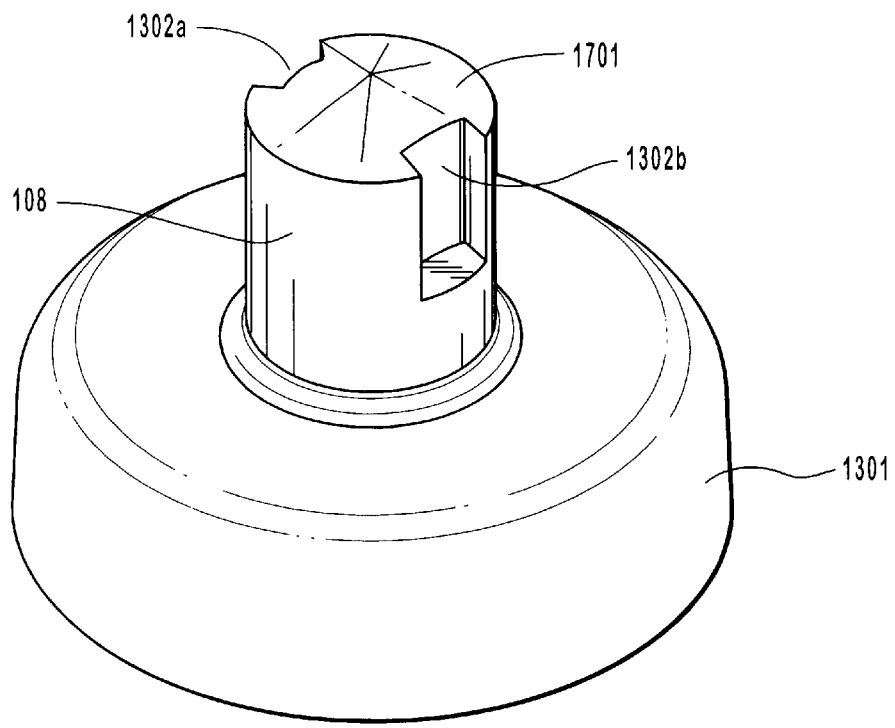
FIG. 17 depicts the top perspective view of the locking wheel of this invention.

FIG. 17 shows the top perspective view of the locking wheel 1102 of this invention. In particular, this view provides additional detail of the shaft guide 108 and its notches 1302a,b. The top surface 1701 of the shaft guide 108 is shown.

Figure 18:
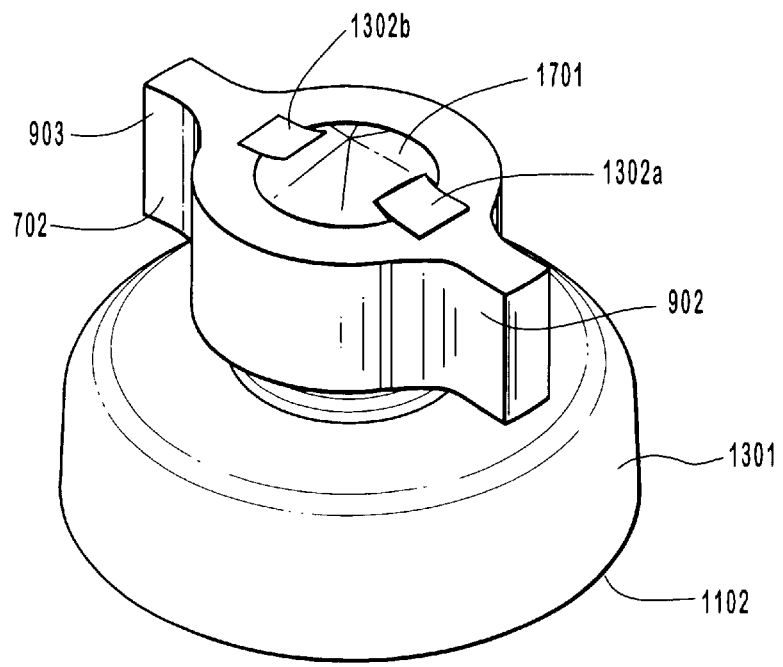
FIG. 18 depicts the top perspective view of the locking wheel and load propeller of this invention.

FIG. 18 shows the top perspective view of the locking wheel 1102 and load propeller 702 of this invention. In particular, this view shows the load propeller 702 mounted on the outer surface 1301 of the locking wheel 1102. The propeller blades 902, 903 are shown extending out from the top surface of the shaft guide 1701, in general alignment with the notches 1302a,b.

Figure 19:
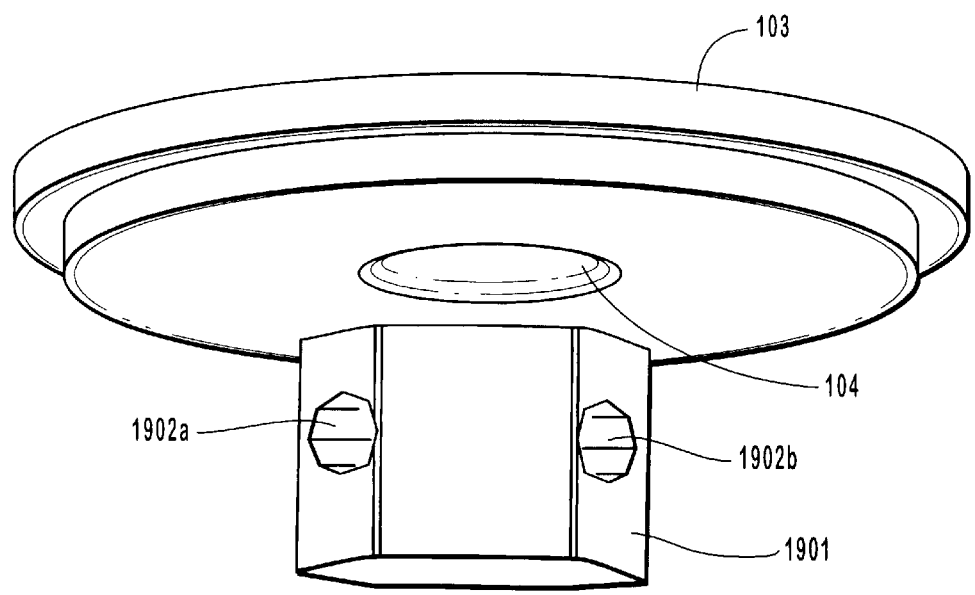
FIG. 19 depicts the bottom perspective view of the locking wheel of this invention.

FIG. 19 shows the bottom perspective view of the housing cover 103 of this invention. In particular, this view shows the upper shaft guide 104 as well as the valve porting 1901, with two valve ports 1902a,b shown.

Figure 20:
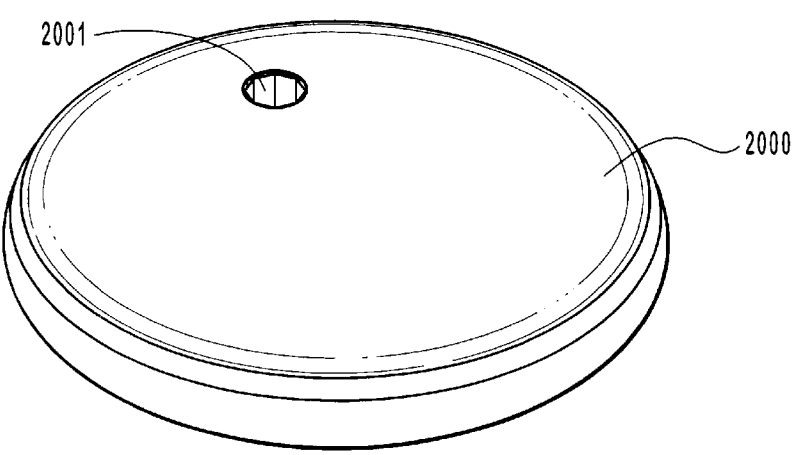
FIG. 20 depicts a perspective view of the housing cover of this invention.

FIG. 20 shows a perspective view of the top 2000 of the housing 103 cover of this invention, with the top of the valve port 2001 shown.

Figure 21:
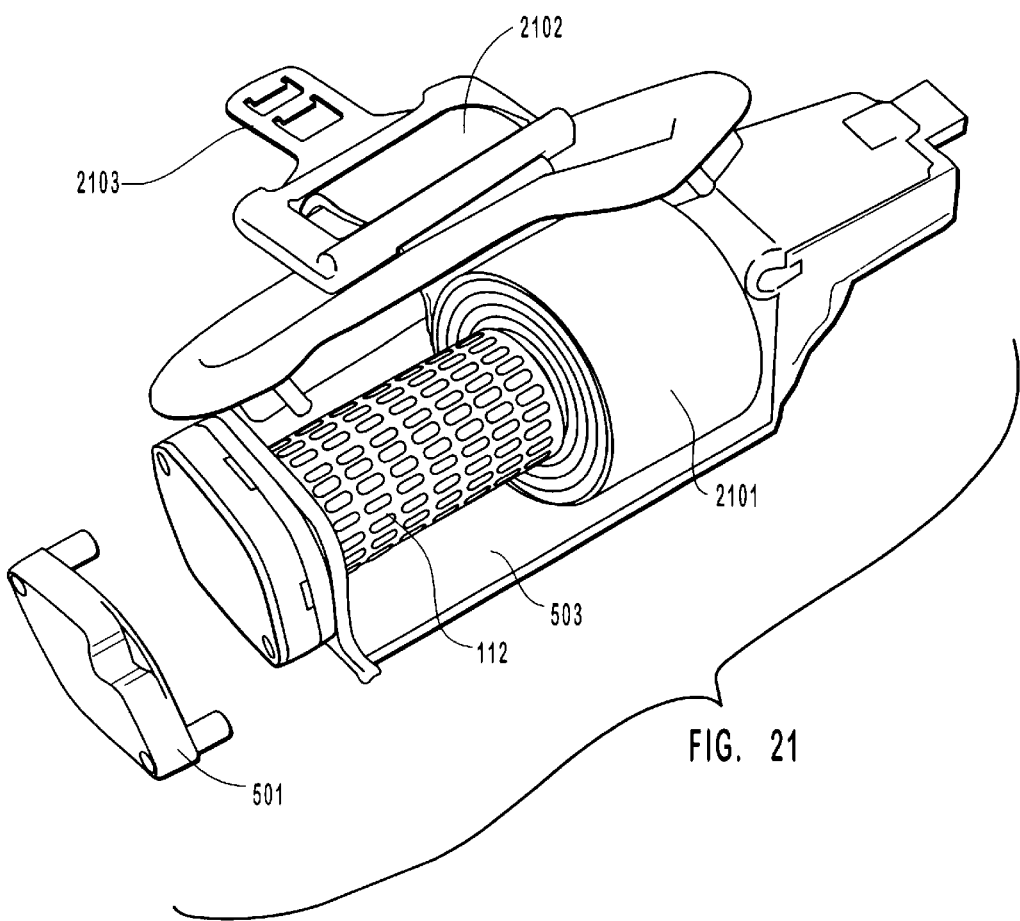
FIG. 21 depicts another view of a typical retractor with a hydro/mechanical adaptive load limiter.

FIG. 21 shows another view of a typical retractor with a hydro/mechanical adaptive load limiter. This view shows the preferred retractor with a belt restraint 2101 loaded on the retractor spool 112, which in turn is shown mounted to the retractor frame 503. Shown detached from the frame 503, but proximate to its preferred location is the adaptive load cell 501. A loop 2102 of the belt 2101 is provided to connect the belt 2101 to the preferred seat belt tong 2103.

Figure 22:
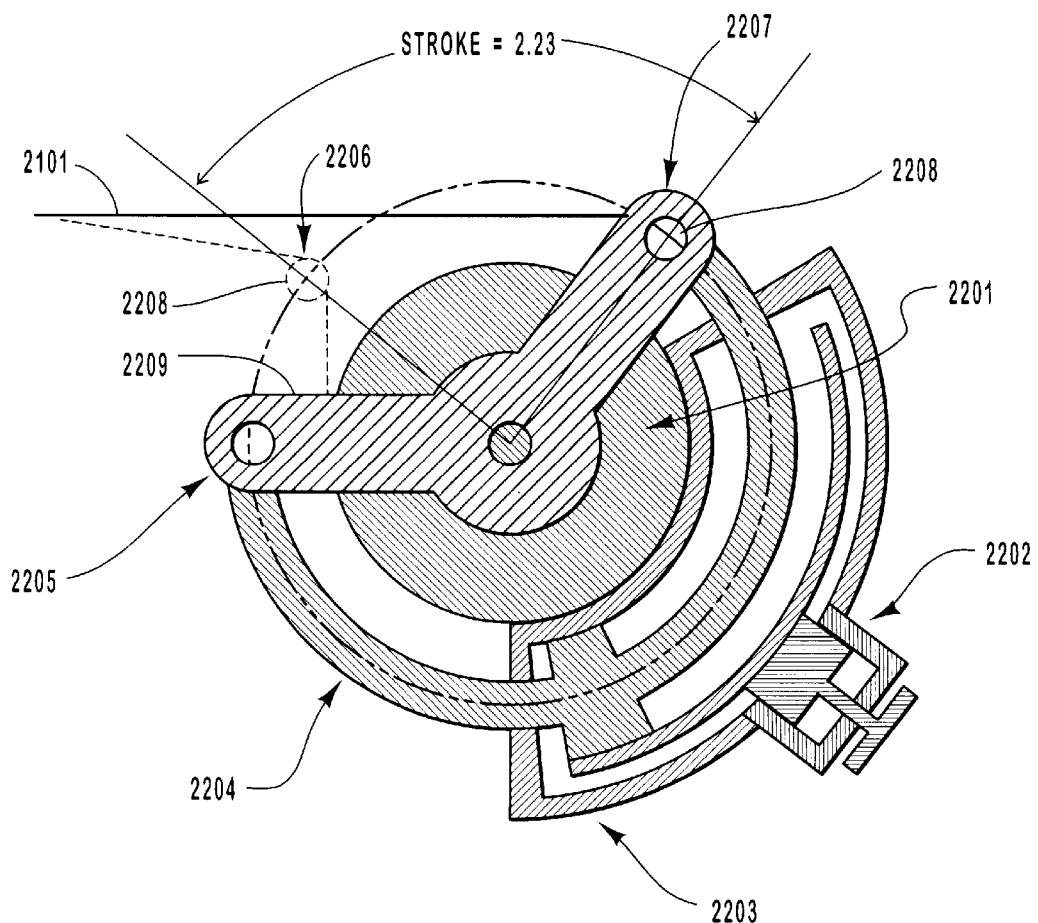
FIG. 22 depicts a schematic view of the basic construction of the preferred adaptive load managed retractor.

FIG. 22 shows a schematic view of the basic construction of the preferred adaptive load managed restraint. This view shows the belt 2101 wrapped around a spool 2208 in both the extracted position (maximum loaded position) 2206 and the stored position 2207. The main body of the retractor 2201 is shown with the spool guide 2209 attached to the end of the retractor 2201. A drive shaft 2204 on which the spool guide 2209 is shown mounted around the main body of the retractor 2201. An alternative view 2203 of the housing 107 is shown with a flow controller 2202 provided.

spool guide 2209 is shown mounted on the drive shaft 2204, which is disposed around the main body of the retractor 2201. An alternative view 2203 of the housing 107

Figure 23:
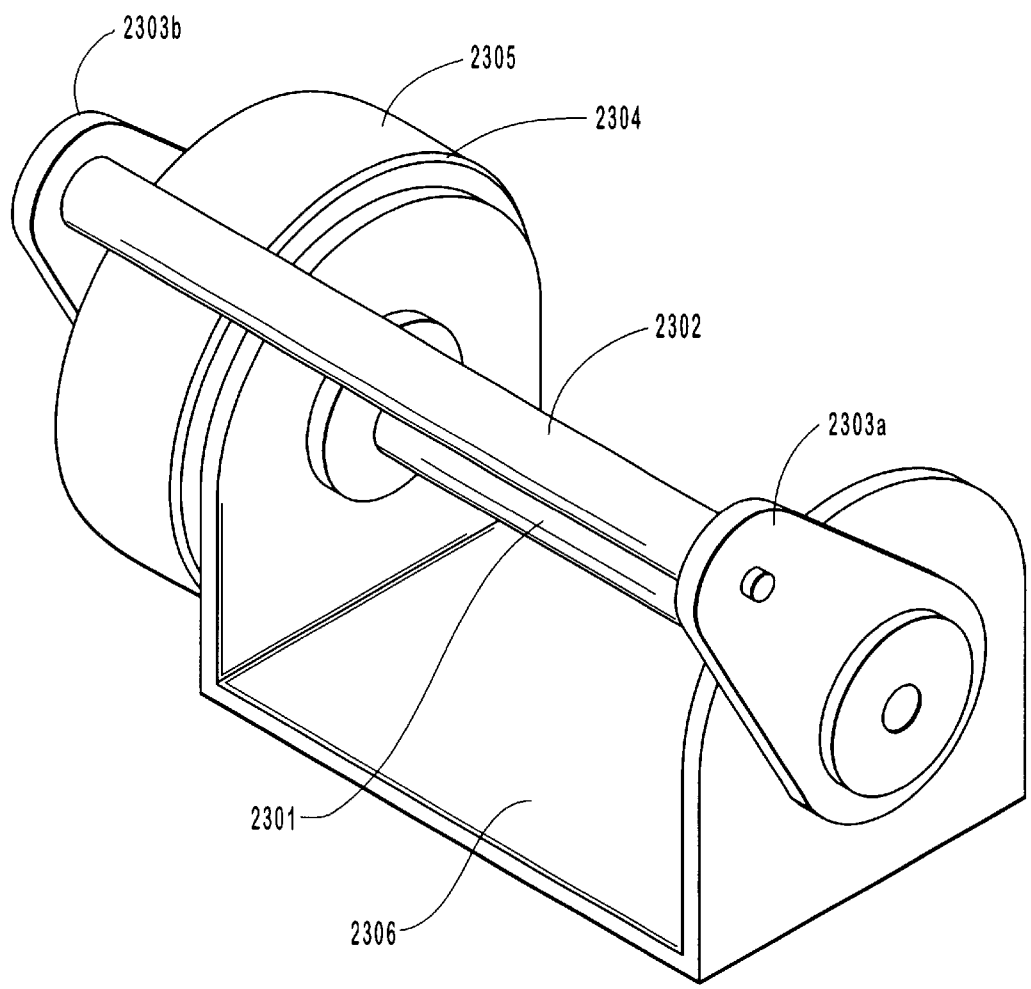
FIG. 23 depicts a perspective view of the top side of the preferred adaptive load managed retractor.

FIG. 23 shows a perspective view of the top side of the preferred adaptive load managed retractor. This view shows a drive shaft 2301 connected to a brake (see 2400 of FIG. 24) held within a brake housing, that comprises a housing cover 2304 and a housing base 2305. A belt guide 2302 is attached to shaft end retainers 2303a,b, which also is connected to the drive shaft 2301. A retractor frame 2306 is provided for holding the retractor components in place.

Figure 24:
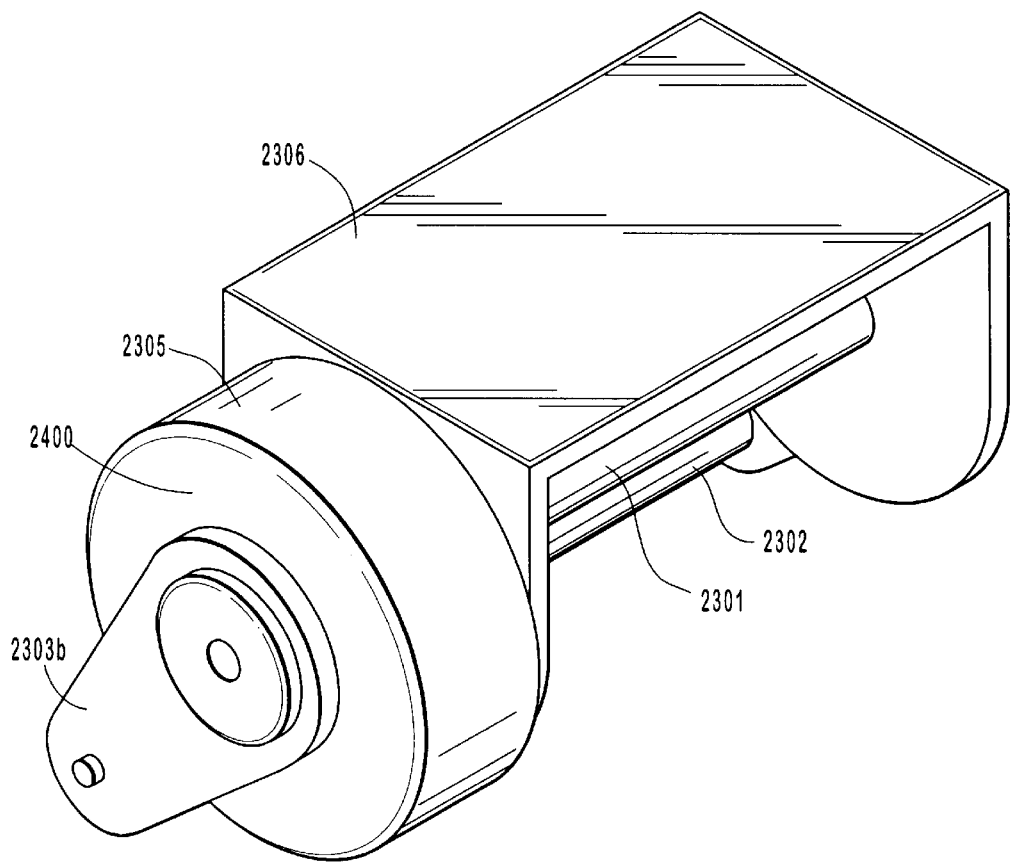
FIG. 24 depicts a perspective view of the bottom side of the preferred adaptive load managed retractor.

FIG. 24 shows a perspective view of the bottom side of the preferred adaptive load managed retractor. This figure shows a cutaway view of the brake 2400 mounted within the housing cover 2304, which is mounted to the retractor frame 2306. The drive shaft 2301 and the belt guide 2302 are shown connected to the frame 2306.

Figure 25:
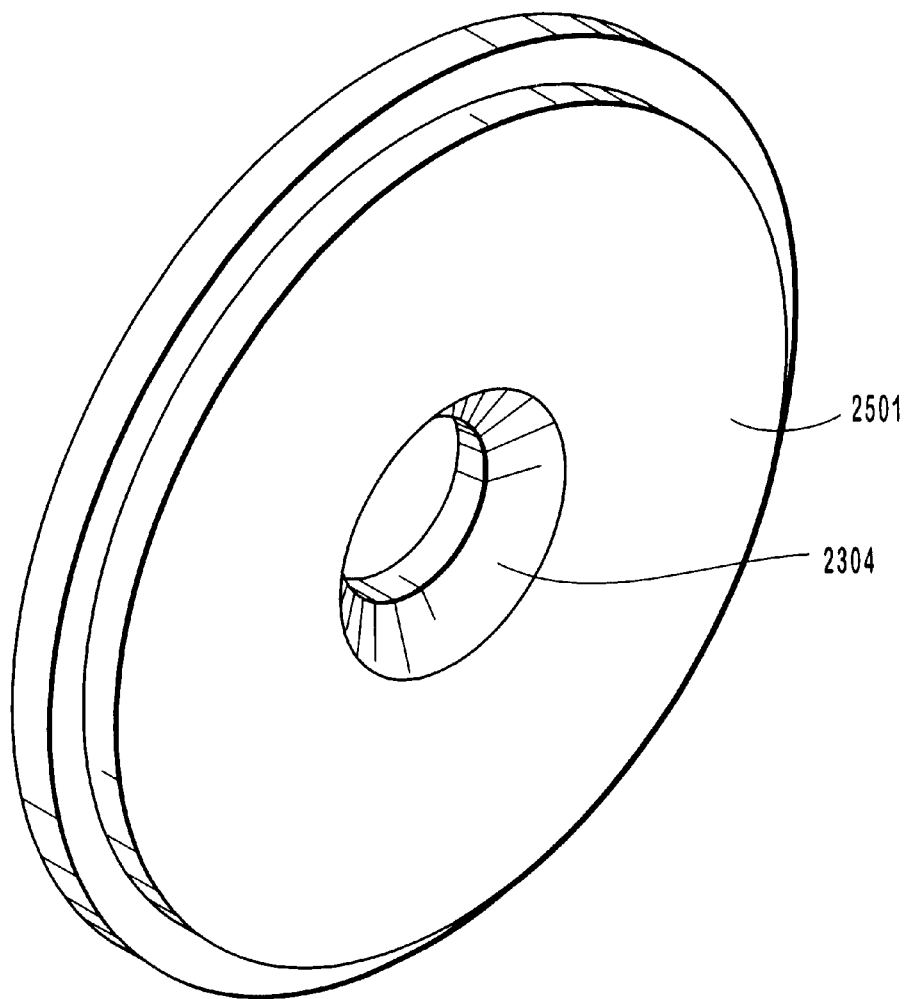
FIG. 25 depicts a perspective view of the preferred brake housing cover of the preferred adaptive load managed retractor.

FIG. 25 shows a perspective view of the preferred brake housing cover 2304 of the preferred adaptive load managed retractor. A drive shaft opening 2501 is provided, generally in the center in the cover 2304.

Figure 26:
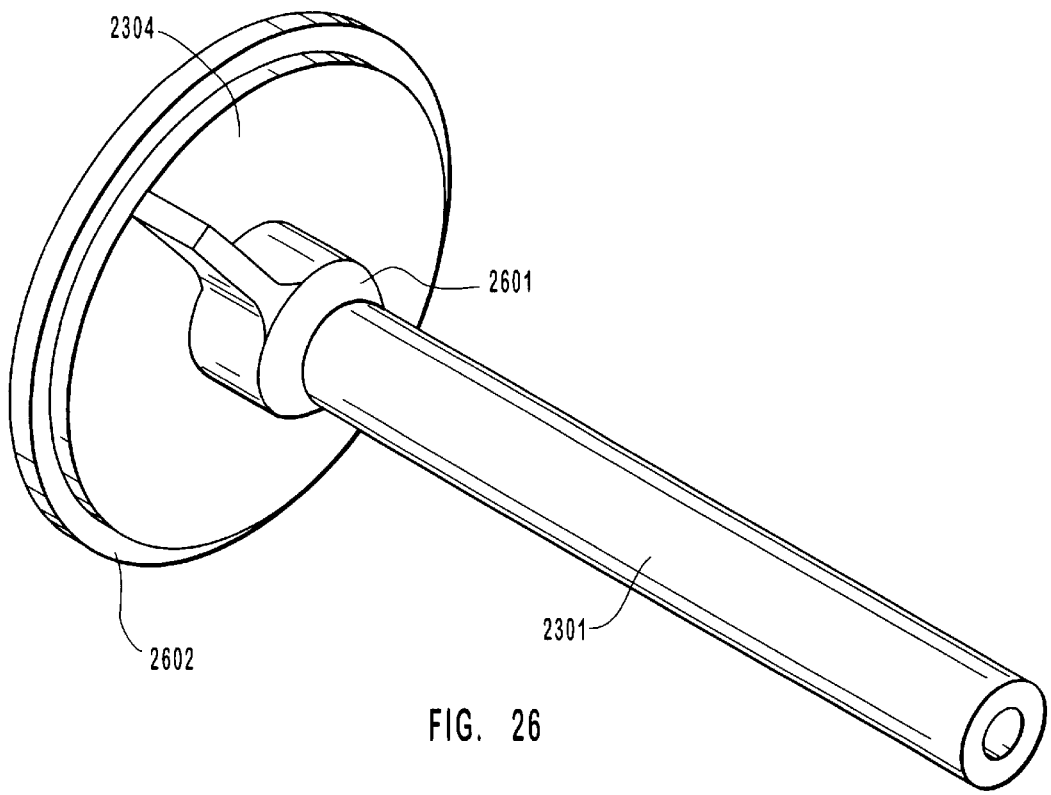
FIG. 26 depicts a perspective view of the preferred drive shaft with the base cover of the adaptive load managed retractor of this invention.

FIG. 26 shows a perspective view of the preferred drive shaft 2301 attached to the brake housing cover 2304 of the adaptive load managed retractor of this invention. A seal 2602 to the cover 2304 is provided. Also, shown is the seal/bearing surface 2601 connecting the drive shaft 2301 to the cover 2304.

Figure 27:
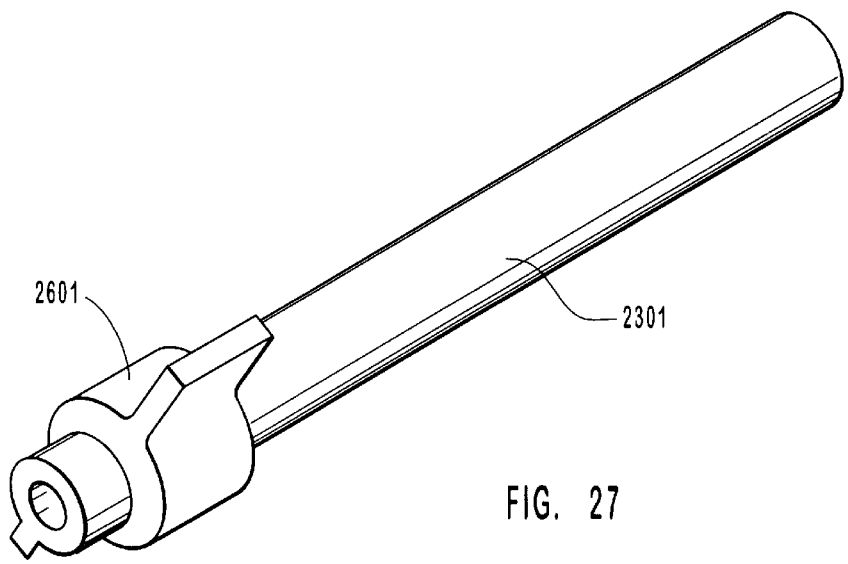
FIG. 27 depicts a perspective view of the preferred drive shaft of the adaptive load managed retractor of this invention.

FIG. 27 shows a perspective view of the preferred drive shaft 2301 of the adaptive load managed retractor of this invention with the brake fixture 2601 attached.

Figure 28:
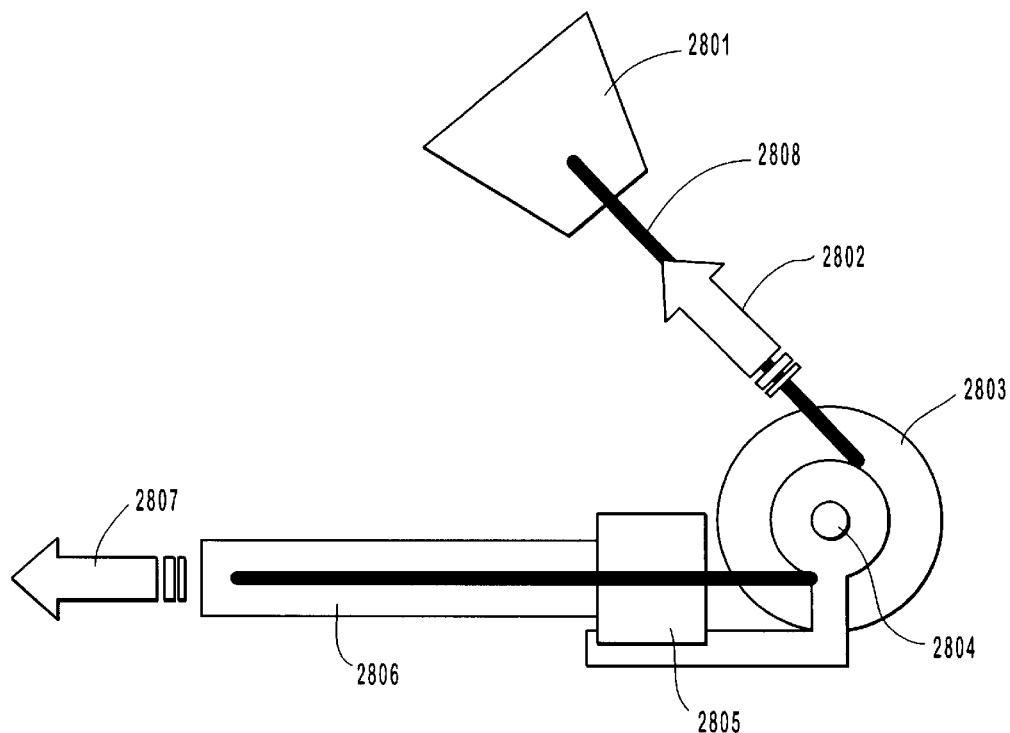
FIG. 28 depicts a schematic view of the buckle adaptive load application of the real time load management system.

FIG. 28 shows a schematic view of the buckle adaptive load application of the real time load management system. The buckle 2801 is attached to the belt 2808, which is load managed in the direction of the arrow 2802. The real time load management adapter 2803 is located between the buckle 2801 and the seat or vehicle anchor mount 2805, approximately on or at an anchor pivot 2804. Connected to the seat or vehicle anchor mount 2805 is the buckle pretensioner 2806, which is deployed in the direction shown by the second arrow 2807. When the pretensioner 2806 is deployed it pulls the buckle 2801 inward toward the anchor pivot point 2804. The adaptive load manager 2803 is activated upon completion of the pretensioner 2806 stroke. The load cell 504, shown in FIG. 5, then manages the occupant restraint displacement from the pivoting point 2804 of the buckle anchor. Triggering the control valve/port of this invention 100 can be optimally sequenced in time through the use of an automatic control module. By setting the valve or control limit relative to occupant weight, this system can be anticipatory, rather than reactionary.

Figure 29:
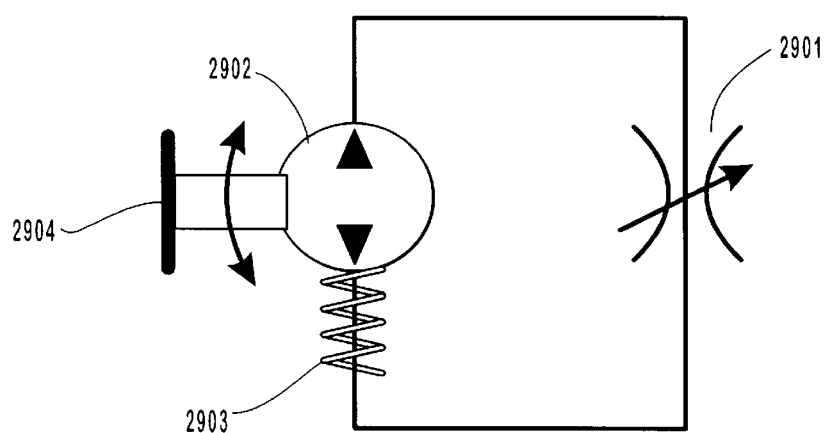
FIG. 29 depicts a schematic view of the typical and preferred fluidic circuit of this invention.

FIG. 29 shows a schematic view of the typical and preferred fluidic circuit of this invention. The reactor spool shaft 2904 is driven by a mechanical dual direction positive displacement pump 2902, which is provided with a spring return 2903, to limit creep and allow for multiple use. Flow is controlled 2901 to be self-adjusting and may be an electromechanical control.

Positive displacement is provided by a telescoping fixture 3201 mounted on a steering column 3205, controlled by a bi-directional flow controller 3203, which preferably is electro-mechanically activated and de-activated. Bi-directional flow controller 3203 restricts, or manages, compression loading during an impact event. During normal use, that is non-sensed "g" events, load management 3204 is provided.

The described components and embodiments are to be considered in all respects only as illustrative and not as restrictive. The scope of this invention is, therefore, indicated by the appended claims rather than be the foregoing description. All changes, which come within the meaning and range of equivalency of the claims, are to be embraced as within their scope.

I claim:

1. A vehicle safety system, comprising:
   a seat belt retractor; and
   a load limiter attached to the retractor, the load limiter configured to engage during a crash so as to selectively reduce the load on the retractor, the load limiter having a rotor drive coupled to a rotor, the rotor drive constructed such that during a crash, the rotor drive engages with the retractor and causes the rotor to reduce the load on the retractor by displacing a fluid through a valve, the load limiter further comprising a release mechanism on the rotor drive, the release mechanism configured to automatically reset the load limiter so that the vehicle safety system continues to function properly after the first use.

2. A vehicle safety system as in claim 1 wherein the vehicle safety system further comprises one or more sensors that communicate with the load limiter.

3. A vehicle safety system as in claim 2 where the one or more sensors are individually selected from the group consisting of a low "g" sensor, a high "g" sensor, an occupant position sensor, a seat belt latch sensor, a seat position sensor, an occupant weight sensor, and a belt displacement sensor.

4. A vehicle safety system as in claim 2 wherein the one or more sensors communicate with the load limiter through sensor extensions.

5. A vehicle safety system as in claim 1 wherein the load limiter comprises a fluidic torque converter.

6. A vehicle safety system as in claim 1 further comprising a control module.

7. A vehicle safety system, comprising:
 a seat belt retractor; and
 a load limiter attached to the retractor, the load limiter configured to engage during a crash so as to selectively reduce the load on the retractor, the load limiter having a rotor drive coupled to a rotor, the rotor drive constructed such that during a crash, the rotor drive engages with the retractor and causes the rotor to reduce the load on the retractor by displacing a fluid through a valve, the load limiter further comprising a return spring on the rotor drive, the return spring configured to automatically reset the load limiter so that the vehicle safety system continues to function properly after the first use.

8. A vehicle safety system as in claim 7 wherein the vehicle safety system further comprises one or more sensors that communicate with the load limiter.

9. A vehicle safety system as in claim 7 wherein the load limiter comprises a fluidic torque converter.

10. A vehicle safety system, comprising:
 a seat belt retractor;
 a load limiter attached to the retractor, the load limiter configured to engage during a crash so as to selectively reduce the load on the retractor, the load limiter having a rotor drive coupled to a rotor, the rotor drive constructed such that during a crash, the rotor drive engages with the retractor and causes the rotor to reduce the load on the retractor by displacing a fluid through a valve, the load limiter further comprising a release mechanism on the rotor drive, the release mechanism configured to automatically reset the load limiter so that the vehicle safety system continues to function properly after the first use;
 a control module in communication with the load limiter, the control module configured to cause the load limiter to engage during a crash; and
 one or more sensors communicating with the load limiter.

11. A vehicle safety system as in claim 10 wherein the one or more sensors are selected from the group consisting of a low "g" sensor, a high "g" sensor, an occupant position sensor, a seat belt latch sensor, a seat position sensor, an occupant weight sensor, and a belt displacement sensor.

* * * * *